United States Patent
Dornhege et al.

(10) Patent No.: US 9,180,912 B2
(45) Date of Patent: Nov. 10, 2015

(54) SYSTEM AND METHOD FOR STEERING TORQUE COMPENSATION DURING BRAKING EVENT

(71) Applicant: Ford Global Technologies, Dearborn, MI (US)

(72) Inventors: Jens Dornhege, Pulheim (DE); Martin Saeger, Pulheim (DE); Frank Peter Engels, Solingen (DE)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/178,510

(22) Filed: Feb. 12, 2014

(65) Prior Publication Data

US 2014/0229065 A1    Aug. 14, 2014

(30) Foreign Application Priority Data

Feb. 14, 2013 (DE) .......................... 10 2013 202 422

(51) Int. Cl.
*B62D 6/00* (2006.01)
*B62D 15/02* (2006.01)
*B60T 17/22* (2006.01)
*B60T 8/17* (2006.01)
*B62D 5/04* (2006.01)
*B60T 8/1764* (2006.01)
*B60T 7/02* (2006.01)
*B60T 8/00* (2006.01)

(52) U.S. Cl.
CPC ............ *B62D 15/025* (2013.01); *B62D 5/0472* (2013.01); *B60T 7/02* (2013.01); *B60T 8/00* (2013.01); *B60T 8/17* (2013.01); *B60T 8/1764* (2013.01); *B60T 17/22* (2013.01); *B60T 2220/03* (2013.01); *B60T 2260/024* (2013.01); *B62D 5/04* (2013.01); *B62D 5/0463* (2013.01); *B62D 6/00* (2013.01); *B62D 6/003* (2013.01)

(58) Field of Classification Search
CPC ........... B62D 6/00; B62D 5/04; B62D 6/003; B62D 5/0472; B60W 10/04; G05D 1/02; B60T 8/1764; B60T 7/02; B60T 2260/024; B60T 8/00; B60T 17/22; B60T 8/17; B60T 2220/03
See application file for complete search history.

(56) References Cited

U.S. PATENT DOCUMENTS

| | | | |
|---|---|---|---|
| 2006/0086560 A1* | 4/2006 | Furusho | B62D 5/0463 180/446 |
| 2008/0208412 A1* | 8/2008 | Shinmura | B62D 9/002 701/42 |
| 2010/0161181 A1* | 6/2010 | Chassagnol | B60T 8/1755 701/42 |

FOREIGN PATENT DOCUMENTS

| | | |
|---|---|---|
| DE | 10102347 A1 | 8/2001 |
| DE | 60113233 | 1/2007 |
| DE | 102005045243 | 3/2007 |
| DE | 102008042666 B4 | 3/2011 |

\* cited by examiner

*Primary Examiner* — Behrang Badii
(74) *Attorney, Agent, or Firm* — Angela M. Brunetti; Raymond Coppiellie

(57) ABSTRACT

A system and method for steering torque compensation carried out in a controller of a vehicle that detects a braking event from a comparison of actual vehicle information with a corresponding threshold value, determines a steering torque compensation signal, generates a request to implement the steering torque compensation signal, and implements the steering torque compensation signal during the braking event.

22 Claims, 3 Drawing Sheets

SYSTEM AND METHOD FOR STEERING TORQUE COMPENSATION DURING BRAKING EVENT

CROSS REFERENCE

This application references foreign filed application number DE 10 2013 202422.3, filed on Feb. 14, 2013, whose subject matter is incorporated by reference herein and provides the basis for a claim of priority of invention under 35 U.S.C. §119.

TECHNICAL FIELD

The inventive subject matter relates to steering torque compensation on a vehicle and more particularly to a method for compensating for torque disturbances in a vehicle steering system during a vehicle braking event.

BACKGROUND

Electric motor power assisted steering systems are known for exerting assistance functions that support a driver of a motor vehicle. Steering torques to be applied by the driver may be reduced by way of an electric motor superimposing an assist torque. The steering torque applied by the driver can be reduced by an electric motor in the steering system that generates an assist torque itself and such reduces the steering torque that has to be applied by the driver. For active steering systems, the assist torque may depend upon vehicle states such as steering angle, steering rate, and vehicle speed.

A typical steering control unit on a vehicle has a steering torque sensor to sense an actual steering torque and a steering angle sensor to sense a steering angle, both of which are generally part of the steering column or the steering gear. The steering control unit imposes an assist torque in addition to a steering torque applied by the driver. Most active steering systems are capable of compensating for disturbances acting upon the wheels and steering column of the motor vehicle while the vehicle is in motion, i.e., pull-drift compensation. However, active steering systems that compensate for noise have not taken into account a braking event when determining and applying steering torque compensation.

There is a need for a steering torque compensation system and method that provides a steering torque compensation in a steering control unit during a vehicle braking event.

SUMMARY

A method and system are provided for detecting a braking event in parallel with determining a torque compensation signal to be applied by the steering control unit and implementing the torque compensation signal during the braking event.

The system and method also consider a threshold value corresponding to vehicle information representative of a braking event, and a predetermined torque limit signal when determining and implementing the torque compensation signal. The detection of the braking event ma be accomplished by way of vehicle signals including, but not limited to, an operating characteristic of a friction brake on the vehicle, an operating characteristic of a brake retarder on the vehicle, an operating characteristic of a generator on the vehicle, and/or a signal representative of an engine torque.

The system and method also consider the presence of a spare wheel fated on the vehicle. In the event a spare wheel has been fitted on the vehicle, the threshold value corresponding to vehicle information representative of the braking event and/or the predetermined torque limit signal may be adjusted to compensate for the presence of the spare wheel.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
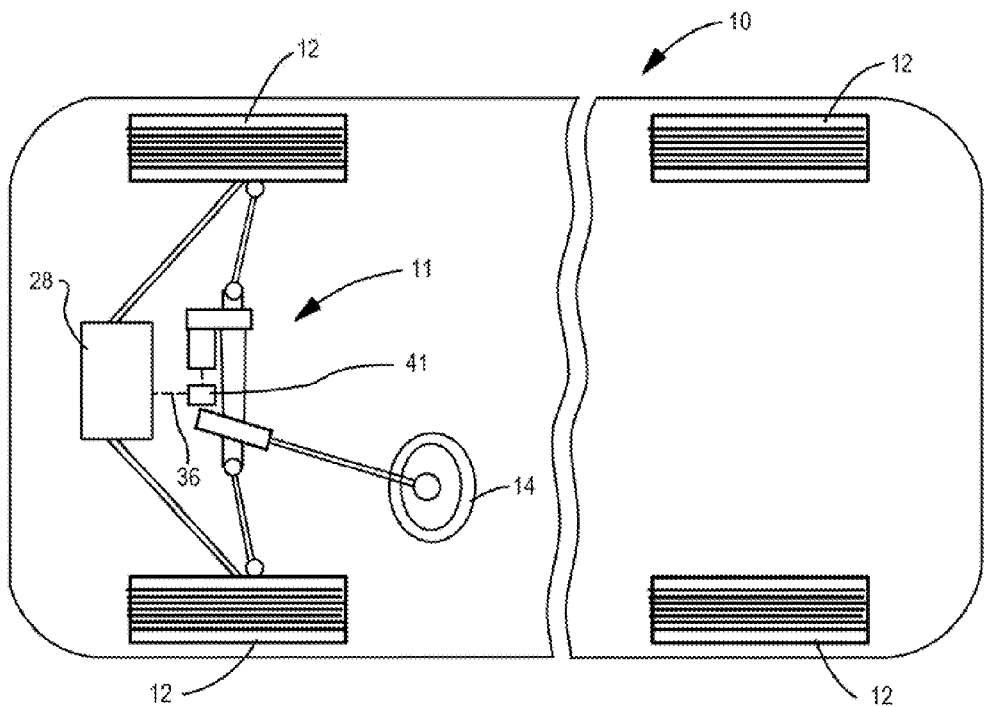
FIG. 1 is a motor vehicle having a steering control unit equipped with the system of the inventive subject matter.

FIG. 1 is a motor vehicle 10 having a steering system 11 equipped with a system capable of carrying out the method of the inventive subject matter. The vehicle has wheels 12 and at least the two front wheels 12 of the vehicle 10 are steerable by way of the steering system 11. The steering system 11 has a steering wheel 14 that is operable by a driver of the motor vehicle. Using the steering wheel 14, the driver indicates to the steering system 11 a direction in which the vehicle 10 is intended to move.

The vehicle 10 also has a braking system 28 for braking, at least the front wheels 12 of the vehicle 10. The braking system 28 may be, but is not limited to a friction brake, a hydrodynamic or electrodynamic retarder, a driver motor generating drag torque, a recovery system, a generator or an air brake. In any system, the braking system 28 or another vehicle assistance system, a signal representative of a braking, event 36 is communicated to the steering system 11.

Figure 2:
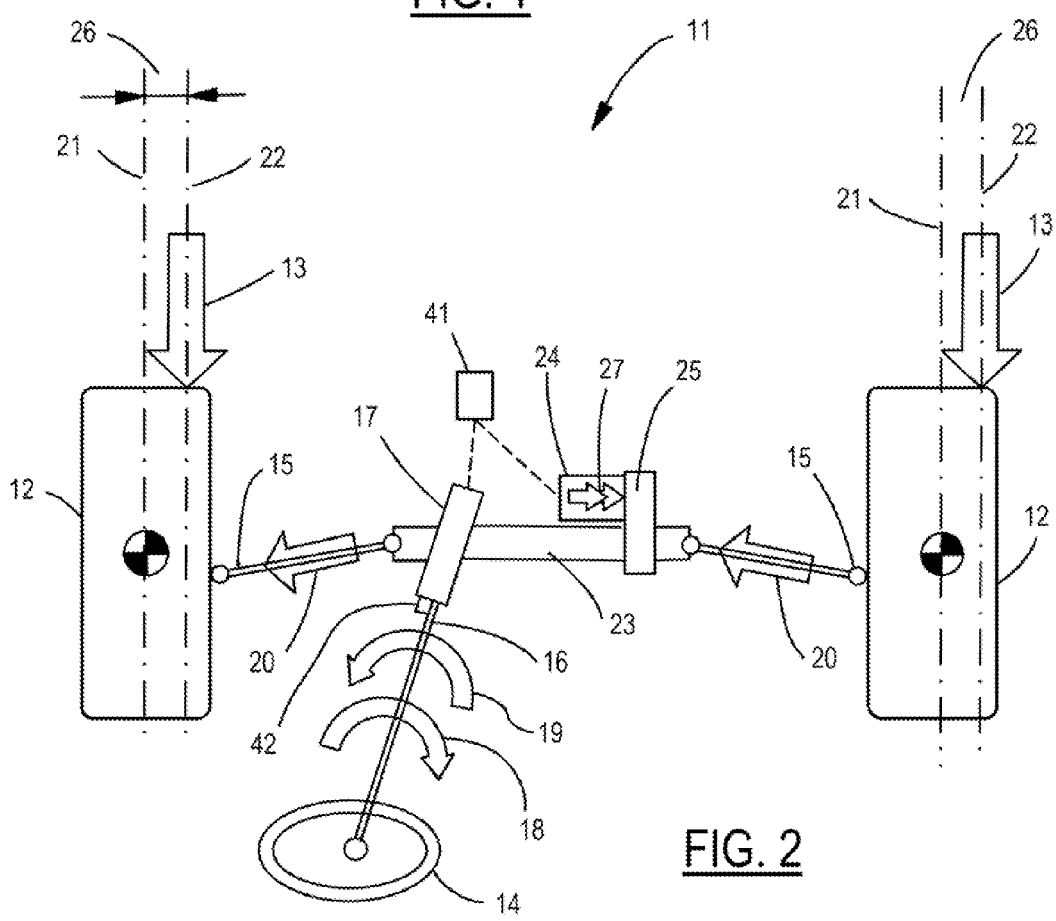
FIG. 2 is the steering control unit equipped with the system of the inventive subject matter.

Referring now to FIG. 2, the steering system 11 is shown in greater detail. The steering system 11 has a steering force booster 24, an example of which is shown herein as an electric, motor 24 coupled to a steering rack 23. A gearbox 25 couples the electric motor 24 to the steering rack 23 by way of a ball circulation mechanism. The steering rack 23 is connected to left and right tie rods 15 that steer wheels 12. The steering rack 23 is also connected, by way of a steering gearbox 17, to a steering column 16, which is connected to the steering wheel 14. The steering system 11 has an electronic steering control unit 41 (i.e., a controller, a signal processing device, a data processing device) that controls the boosting of the steering force of the electric motor 24 by way of instructions in a memory of the control unit 41. The steering system 11 has a torque sensor 42 that is positioned on the steering column 16 to sense/measure an operating force (steering torque) applied to the steering wheel 14 by the driver of the vehicle.

An example of a braking event is also shown in FIG. 2. A braking event exists if mechanical energy is extracted from the moving vehicle or mechanical energy of the vehicle is converted into other forms of energy. Mechanical and/or electrical/magnetic braking power is acting on the motor vehicle during a braking event. Forces and/or torques 13 are then exerted on the steerable wheels 12 such that the vehicle speed is reduced when travelling on a flat road, not increased when travelling downhill, or more strongly reduced while travelling uphill than would be caused by the gradient alone. The forces and torques may be generated by any know vehicle braking system.

The braking event may be identified from information provided directly from the braking system on the vehicle. Information about the braking event may also be derived from other vehicle systems such as an anti-lock braking system, an electronic stability system or any other vehicle system whose sensors determine wheel revolution rates and/or vehicle speed and/or vehicle acceleration.

Referring still to FIG. 2, a brake force 13 is acting on each of the steerable wheels 12. In the braking event shown, the brake force 13 is acting on each wheel 12 on a line of action 22 displaced by a distance 26 from a neutral line 21 of the wheel 12. This results in brake pull 20, also known as brake drag. Brake pull 20 is intended to be compensated for according to the system and method of the inventive subject matter.

It should be noted that the braking event exemplified in FIG. 2 is only one of many possible causes of brake pull 20. For example, brake pull 20 may be caused by a magnitude of brake force on one wheel that is different than the magnitude of brake force on another wheel, resulting in different coefficients of friction of a road surface or different strengths in braking action of the braking device. Different air pressures in the tires and different tire profiles may also cause brake pull 20.

Brake pull 20 acts on the steering wheel 14 by way of tie rods 15, the toothed rack 23 and the steering column 16. Brake pull 20 may be perceived by the driver as an interference torque 18 at the steering wheel 14. According to the inventive subject matter, a counter torque 19 corresponding in magnitude and direction neutralizes the interference torque 18. A motor torque 27 generated by the electric motor 24 of the steering system counteracts 19 the interference torque 18 and the interference torque 18 is no longer (or is less) detectable by the driver. At the same time, the direction of travel of the vehicle 10 is not influenced by the counter torque.

Figure 3:
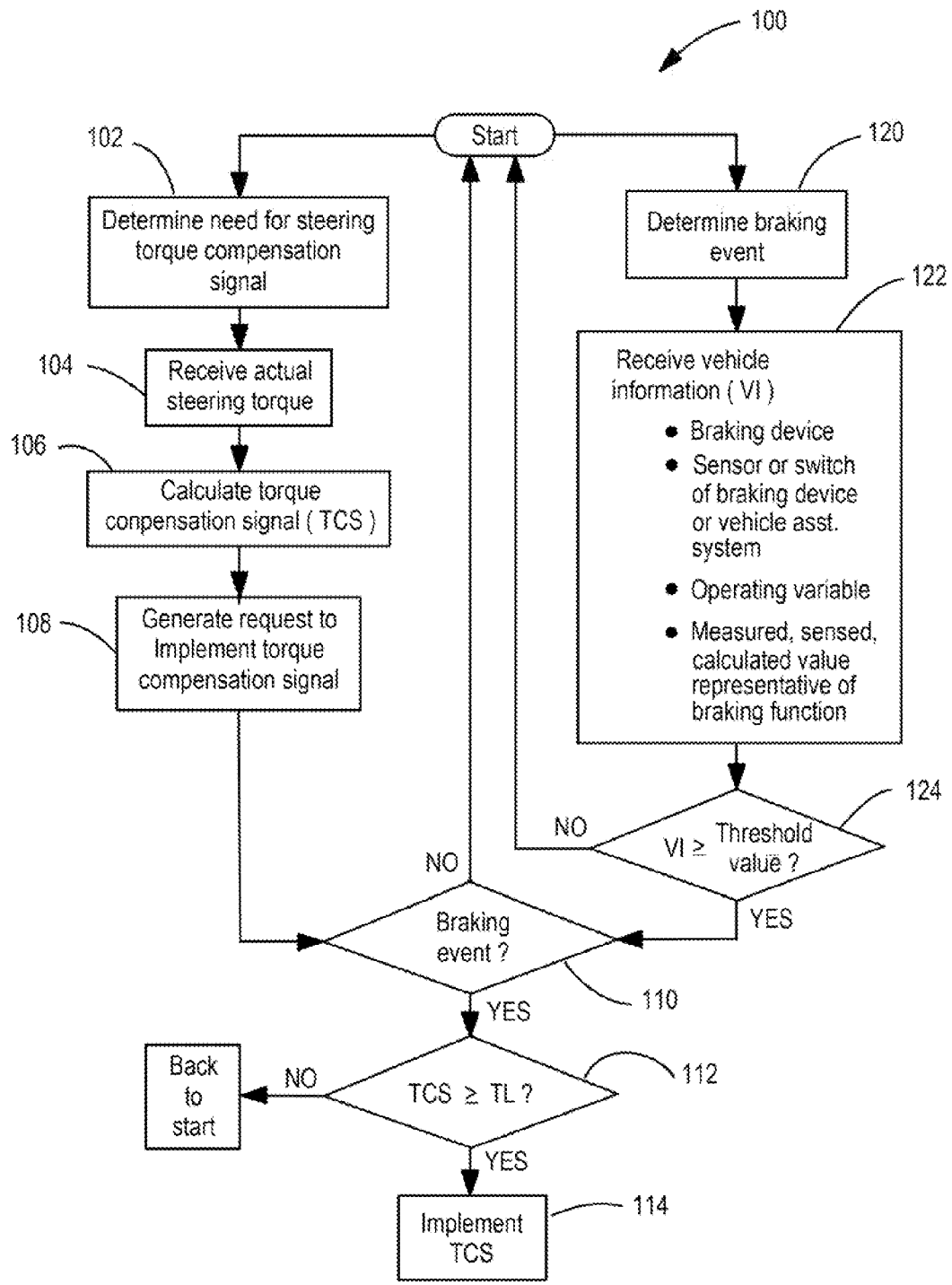
FIG. 3 is a flow chart of a method of the inventive subject matter.

Referring to FIG. 3, a flow chart of a method 100 of the inventive subject matter carried out in the steering control unit 41, is shown. The method includes a determination 102 of the demand, or need, for a torque compensation signal. The determination 102 of the torque compensation signal takes place in parallel with a determination 120 of a braking event.

When determining 102 the torque compensation signal, the steering torque sensor senses and supplies 104 the actual steering torque signal to the steering control unit. A target steering torque, which may be a predetermined value or a calculated value, is stored as a target steering torque signal in a memory of the steering control unit. The method of the inventive subject matter determines 106 a torque compensation signal as a function of the actual steering torque signal and the target steering torque signal. The steering torque compensation signal of the inventive subject matter corresponds in magnitude to the difference between the actual steering torque signal and the target steering torque signal. The steering torque compensation signal corresponds in direction as the opposite direction of the difference between the actual steering torque signal and the target steering torque signal. The method generates 108 a request to implement the torque compensation signal.

As discussed above, the determination 120 of the braking event is carried out in parallel with the determination 102 of the torque compensation signal. Vehicle information that indicates a braking event originates from devices on the vehicle and is received by 122 the controller or signal processor for comparison 124 to a threshold value.

There are several sources available for vehicle information, at least one of which is used, to determine the braking event. The vehicle information may be the braking device itself, or an operation sensor or switch of the braking device. For such operation, the braking device has a signaling connection to the steering control unit. In the alternative or in addition to, the vehicle information about a braking event may come from somewhere other than the braking device, such as an assistance system of the vehicle including but not limited to an anti-lock braking system, an electronic stability system, a speed regulating system. The vehicle information about a braking event is an operating value of a braking device and may be wheel revolution rates and/or deceleration of the motor vehicle that are passed on to the steering control unit. In the simplest form, the vehicle information is a value or signal that confirms activation of the braking device. An operation sensor provides such a value and has a signaling connection to the steering control unit. The value or signal may also come from a braking device from which a brake function may be determined. Sensors of the braking device may supply a sensed and/or measured and/or calculated signal that is representative of a value of signal from the braking device to the steering control unit.

Referring still to FIG. 3, to determine whether a vehicle braking event is occurring, vehicle information related to vehicle braking is compared 124 to a corresponding threshold value. The threshold value will be a predetermined value of the same type of vehicle information that is being used in the comparison. The predetermined threshold values may be determined, by calculation or by testing during testing phases of the vehicle and stored in a memory of the controller or signal processing unit, in the steering control unit. A braking event may be determined by comparing the vehicle information with a corresponding threshold value and confirmation of the braking event is identified by the vehicle information meeting or exceeding the corresponding threshold value.

As an example, a friction brake is widely used on motor vehicles. The value of an operating characteristic of the friction brake may be a brake pressure, a signal representative of brake pedal operation, or any activity of the friction brake that causes a braking event. A brake pedal sensor is used to switch on brake lights in a motor vehicle and may also be used to signify a braking event. Any of these may be provided to the steering control unit as an indication of a braking event.

In another example, retarders are used and may be operated hydrodynamically or electrodynamically. The value of an operating characteristic of the retarder may be a value of a revolution rate of its rotor or a signal of a retarder operation sensor or switch. In still another example, an operating characteristic of a generator may be used to indicate a brake event. Generators are being used for regeneration in motor vehicles. A value of an operating characteristic of the generator may be a revolution rate of its rotor or an amplitude of current. Yet another example of vehicle information representative of a braking event may be a value of an engine torque drag. Engine torque drag is generated by a drive motor of the vehicle. The engine torque drag acts on the front wheels of the vehicle and is often used with internal combustion engines for slight braking of the motor vehicle. In everyday operation of the vehicle, engine torque drag occurs frequently. Any of these signals may be provided to the steering control unit as an indication of a braking event.

According to the inventive subject matter, when the vehicle information is compared 124 to the threshold value and if the vehicle information meets or exceeds the threshold value, a braking event is identified 110. Provided a braking event of the motor vehicle has been identified 110, the method compares 112 the steering torque compensation signal to a predefined torque limit. In the event the steering torque compensation signal meets or exceeds the predefined torque limit, the method implements 114 the steering torque compensation signal to the steering torque by way of the steering control unit. Should the steering torque compensation signal be deemed less than the predefined torque limit, the steering torque compensation signal will not be implemented. This ensures that the request for a counter torque is made and implemented only after a defined level of the demand for a counter torque. This aids in the possibility of responding differently to different driving states, as well as preventing unnecessary or unwanted modifications to the steering torque.

The wheels of a vehicle will also affect brake pull. The thresholds of the inventive subject matter may need to be changed during the determination of a braking event and/or during the implementation of the torque compensation signal under certain conditions. If a spare wheel is fitted to the vehicle, the threshold value and/or the torque limit may be changed. Because of the spare wheel, which typically has a smaller diameter, a different wheel offset, a narrower width and a poorer performance than a standard wheel, asymmetrical states, which provide brake pull, may occur more readily. By modifying the threshold value and/or the torque limit used in the method of the inventive subject matter, the spare wheel may, or may not, be compensated for. By reducing the threshold value or the torque limit, the brake pull may be encountered earlier and thus compensated for to improve the comfort of the driver. In the alternative, by increasing the threshold value or torque limit, the system and method of the inventive subject matter is not so quick to compensate for the presence of the spare wheel thereby keeping the driver better conscious of the fact that the spare wheel is on the vehicle. By not as easily or quickly compensating for the presence of the spare wheel, the driver is more likely to remain aware of the fact that a spare wheel is fitted on the vehicle and therefore use a driving style more appropriately adapted to the properties of the spare wheel.

Figure 4:
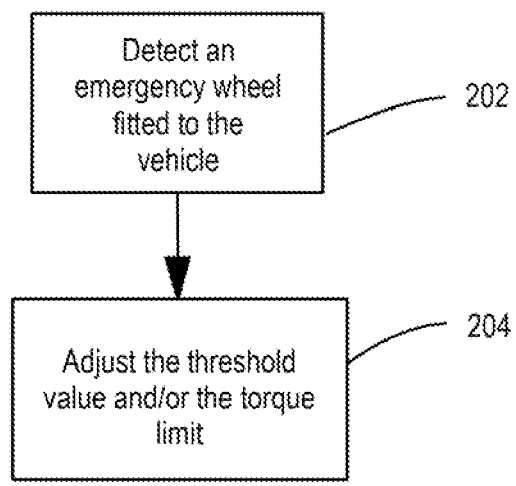
FIG. 4 is a flow chart of threshold and limit value adjustments for the method of the inventive subject matter.

Referring to FIG. 4, the method of the inventive subject matter detects 202 a sparewheel that is fitted on the vehicle. An adjustment 204 may be made to either, or both, the threshold value used in the comparison 124 and the torque limit used in the comparison 112 of the method in FIG. 3. The adjustment 204 may be either an increase or a decrease in the threshold value and/or the torque limit. A decrease in either or both values will ensure that brake pull is not perceptible by the driver. An increase in either or both values will ensure that corrections for brake pull are not made as easily ensuring the driver remains aware of the fact that a spare wheel is fitted on the vehicle.

In the foregoing specification, the invention has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for steering torque compensation carried out in a controller of a vehicle having a steering system, comprising:
    detecting a braking event from actual vehicle information;
    determining an actual steering torque signal;
    determining a torque compensation signal representative of a difference between the actual steering torque signal and a target steering torque signal;
    generating a request to implement the torque compensation signal; and
    implementing the torque compensation signal during the detected braking event.

2. The method as claimed in claim 1 wherein the actual vehicle information further comprises an operating characteristic of a friction brake.

3. The method as claimed in claim 1 wherein the actual vehicle information further comprises an operating characteristic of a brake retarder.

4. The method as claimed in claim 1 wherein the actual vehicle information further comprises an operating characteristic of a generator.

5. The method as claimed in claim 1 wherein the actual vehicle information further comprises a signal representative of an engine torque.

6. The method as claimed in claim 1 wherein the step of detecting a braking event further comprises comparing actual vehicle information with a corresponding threshold value.

7. The method as claimed in claim 1 wherein the step of implementing the torque compensation signal further comprises the steps of:
- comparing the torque compensation signal with a predetermined torque limit signal; and
- implementing the torque compensation signal when the torque compensation signal exceeds the predetermined torque limit signal.

8. The method as claimed in claim 7 further comprising the steps of:
- detecting a spare wheel fitted on the vehicle; and
- adjusting the predetermined torque limit signal to compensate for the detected spare wheel.

9. The method as claimed in claim 6 further comprising the steps of:
- detecting a spare wheel fitted on the vehicle; and
- adjusting the corresponding threshold value to compensate for the detected spare wheel.

10. The method as claimed in claim 9 further comprising the steps of:
- comparing the torque compensation signal with a predetermined torque limit signal;
- adjusting the predetermined torque limit signal to compensate for the detected spare wheel; and
- implementing the torque compensation signal when the torque compensation signal exceeds the predetermined torque limit signal.

11. A system for steering torque compensation in a vehicle, comprising:
- a steering control unit providing an actual steering torque signal;
- a braking device providing a signal representative of a braking event; and
- instructions, carried out in a signal processing device, to determine an actual braking event, determine a steering torque compensation signal that is a difference between the actual steering torque signal and a target steering torque signal, and implement the steering torque compensation signal during the actual braking event.

12. The system as claimed in claim 11 further comprising a predetermined torque limit signal and the instructions to implement the steering torque compensation signal during the braking event further comprise:
- instructions to compare the torque compensation signal with the predetermined torque limit signal; and
- instructions to implement the torque compensation signal when the torque compensation signal exceeds the predetermined torque limit signal.

13. The system as claimed in claim 12 wherein the instructions to determine an actual braking event further comprise instructions to compare actual vehicle information with a corresponding threshold value.

14. The system as claimed in claim 13 wherein the instructions further comprise:
- instructions to detect a spare wheel fitted on the vehicle; and
- instructions to adjust the predetermined torque limit signal to compensate for the detected spare wheel.

15. The system as claimed in claim 14 further comprising instructions to adjust the corresponding threshold value to compensate for the detected spare wheel.

16. The system as claimed in claim 13 wherein the instructions further comprise:
- instructions to detect a spare wheel fitted on the vehicle; and
- instructions to adjust the corresponding threshold value to compensate for the detected spare wheel.

17. A control system for a vehicle steering control unit comprising:
- a controller;
- a braking event signal representative of a detected vehicle braking event;
- an actual steering torque signal representative of an actual vehicle steering torque;
- a target steering torque signal;
- a steering torque compensation signal derived from a difference between the actual vehicle steering torque signal and the target steering torque signal; and
- instructions carried out by the controller to implement the steering torque compensation signal during, the detected braking event.

18. The system as claimed in claim 17 wherein the braking event signal representative of a vehicle braking event is generated from a comparison of vehicle information to a corresponding threshold value.

19. The system as claimed in claim 18 further comprising:
- a predetermined torque limit signal; and
- instructions to implement the torque compensation signal when the torque compensation signal exceeds the predetermined torque limit signal.

20. The system as claimed in claim 19 further comprising:
- a spare wheel, detection signal representative of an emergency wheel being fitted on the vehicle; and
- instructions to adjust the predetermined torque limit signal to compensate for the detected spare wheel.

21. The system as claimed in claim 20 further comprising instructions to adjust the corresponding threshold value to compensate for the detected spare wheel.

22. The system as claimed in claim 18 further comprising:
- a spare wheel detection signal representative of an emergency wheel being fitted on the vehicle; and
- instructions to adjust the corresponding threshold value to compensate for the detected spare wheel.

* * * * *